Patented Jan. 5, 1937

2,066,925

UNITED STATES PATENT OFFICE 2,066,925

PROCESS FOR REMOVING ACID COMPONENTS FROM HYDROCARBON DISTILLATES

David Louis Yabroff, Oakland, and John Wilkinson Givens, Berkeley, Calif., assignors to Shell Development Company, San Francisco, Calif., a corporation of Delaware No Drawing. Application September 9, 1936, Serial No. 99,964

9 Claims. (Cl. 196—32)

This invention relates to the removal of weakly acid-reacting organic substances from solutions in organic liquids of the type of hydrocarbons, and in particular deals with the removal of mercaptans from petroleum distillates.

It is frequently necessary to eliminate small quantities of organic acidic components such as mercaptans, phenols, naphthenic acids, fatty acids, etc. from their solutions in substantially neutral hydrocarbon type liquids. The term, hydrocarbon type liquids, as herein used, refers to hydrophobe normally liquid organic substances which are neutral or slightly basic, such as the liquid hydrocarbons derived from petroleum, benzene, toluene, xylene, substituted normally liquid hydrocarbons which are substantially insoluble in water, for instance, chlorinated hydrocarbons, of which chlor ethane, ethylene dichloride, tri-chlorethylene, carbon tetrachloride, chlor propane, chlorbutylene, chlorbenzene, brom benzene, are examples; or nitro hydrocarbons, for example, nitroethane, nitrobenzene; or other nitrogen containing hydrocarbons such as the amylamines, aniline, pyridine, petroleum bases, etc.

In our application Serial No. 80,374, filed May 18, 1936, we have disclosed a process and a working theory for separating acid-reacting substances of the type described from their hydrophobe solutions by treatment with an aqueous quaternary ammonium base preferably in the presence of alkali hydroxide. We now have discovered that solutions of ternary sulfonium bases in water and/or non-acid hydrophile organic solvents or substances which are miscible with water in all proportions such as the lower alcohols, ketones, primary, secondary, and tertitary amines, quaternary ammonium bases, amino alcohols, alcohol halides, etc. can be used advantageously for the separation of said organic acid-reacting substances from hydrocarbon type liquids.

Ternary sulfonium bases suitable for the described purposes have the formula

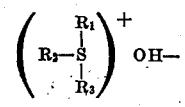

in which R₁ to R₃ are alkyl, unsaturated alkyl, aryl or aralkyl radicals, which may contain polar groups selected from the class of —OH, —NH₂, —NO₂, and halogen, or heterocyclic radicals which are linked to the ternary sulfur atom by way of a carbon atom, which carbon atom may or may not be part of the heterocyclic ring. These sulfonium bases react strongly alkaline and their lower members are readily soluble in water and organic liquids miscible with water in all proportions, and are substantially insoluble in hydrocarbon type liquids, solubility in water tending to decrease and that in hydrocarbon type liquids to increase with increasing size of the organic radicals.

The use of sulfonium bases for the treatment of petroleum hydrocarbons is of especial interest, since most of the materials necessary for the synthesis of these bases are contained in raw petroleum oils and can readily be recovered therefrom. Sulfonium bases may be produced by the simple addition of an alkyl halide, preferably the iodide, to a sulfide of the type

in which both radicals R₁ and R₂ are organic, and liberating the base from the resulting sulfonium halide.

The efficacy of the separation of weak acids depends to a large extent on the concentration of the sulfonium bases in the solution, higher concentrations improving the efficiency of the treatment. Moreover, the nature of the organic radicals has a considerable influence on the solvent power of the sulfonium bases for organic compounds such as the organic acids herein described. In the order of increasing solvent power, the radicals are normal aliphatic, branched aliphatic with secondary carbon atom, branched aliphatic with tertiary carbon atom, olefinic and aromatic. An increase in the number of carbon atoms within a group normally raises the solvent power of the base. Polar groups tend to lower the solvent power, but raise the solubility of the base in water. Thus, from the viewpoint of extraction efficiency, we prefer a sulfonium base containing radicals without polar substitution groups, at least one of which radical is aromatic. For instance, we prefer benzyl diethyl sulfonium hydroxide to methyl diethyl sulfonium hydroxide because of the greater efficiency of the former as may be seen from the illustrative examples tabulated below, in which solutions of various mercaptans in iso-octane were extracted at 20° C. by a single stage treatment with 20% by volume of aqueous sulfonium bases.

| Sulfonium base | Normality | Mercaptan in iso-octane | Initial mercaptan sulfur, percent | Percent mercaptan sulfur removed |
|---|---|---|---|---|
| Benzyl diethyl sulfonium hydroxide | 1.0 | n-butyl | 0.0848 | 99.8 |
| Benzyl diethyl sulfonium hydroxide | 1.0 | n-amyl | .0790 | 99.5 |
| Benzyl diethyl sulfonium hydroxide | 1.0 | n-heptyl | .0825 | 80.7 |
| Methyl diethyl sulfonium hydroxide | 2.5 | n-butyl | .0878 | 97.7 |
| Methyl diethyl sulfonium hydroxide | 2.5 | n-amyl | .0810 | 91.4 |
| Methyl diethyl sulfonium hydroxide | 2.5 | n-heptyl | .0825 | 52.2 |

While ternary sulfonium bases in dilute solutions are comparatively stable, they tend to decompose to a sulfide and an alcohol at higher concentrations. At elevated temperatures, the decomposition proceeds readily, and the presence of alkali metal hydroxide also tends to accelerate the decomposition. In general, sulfonium bases in which all organic radicals consist of alkyl groups are more resistant against decomposition, for instance, at high temperatures and/or in the presence of alkalies, than similar bases in which one or more of the radicals are aryl or aralkyl groups. For instance, the benzyl diethyl sulfonium hydroxide cannot be produced in concentrations higher than about 20% by weight by ordinary concentration methods, such as evaporation of the solvent under ordinary or reduced pressures, while methyl diethyl sulfonium hydroxide can be produced in concentrations of about 50% by weight. To obtain maximum treating efficiencies, we prefer to use sulfonium hydroxide solutions of maximum concentrations available by ordinary concentration methods.

The presence of alkali hydroxide improves the extraction efficiency of the aqueous sulfonium hydroxide for reasons fully explained in our application Serial No. 80,374, filed May 18, 1936. Therefore we contemplate carrying out our extraction process in the presence of a strong inorganic base, as alkali hydroxide, wherever the stability of the sulfonium base permits this. At temperatures not greatly in excess of normal room temperatures, solutions of sulfonium hydroxide in which all organic radicals are alkyl radicals, are usually sufficiently stable to be used in combination with alkali hydroxides for treating purposes, provided the concentration of the sulfonium hydroxide does not exceed about 50% by weight and the concentration of the combined hydroxides is less than about 60% by weight.

Our treatment may be carried out by simply agitating the solution of ternary sulfonium base with the organic hydrocarbon type liquid containing organic acids, and allowing the mixture to segregate to form a layer of the sulfonium solution containing at least a portion of the organic acids and a separate layer of the treated organic liquid, and separating the layers. We prefer, however, to employ a multi-stage countercurrent treatment, in which the solution of sulfonium base and the organic liquid flow in countercurrent to each other through the several stages.

If the hydrocarbon type liquid contains mercaptans and other more strongly acid-reacting substances such as hydrogen sulfide, carboxylic acids, etc. we may subject the liquid to a pretreatment with an aqueous alkaline-reacting substance as alkali hydroxide, substantially to remove the stronger acids. The pretreated liquid is then treated with a solution of sulfonium base in a manner hereinbefore described for the purpose of removing mercaptans. By this pretreatment a substantial saving of sulfonium base can be achieved.

We claim as our invention:

1. In the process of separating acid-reacting substances contained in a hydrocarbon type liquid by treating with an alkaline-reacting substance, the improvement comprising subjecting said liquid to a treatment with a solution of a ternary sulfonium base under conditions to absorb at least a portion of said acid-reacting substances in said solution and to form two layers, one comprising said solution of sulfonium base containing acid-reacting substances and the other consisting of the treated organic liquid, and separating the layers.

2. The process of claim 1, in which the sulfonium base is dissolved in a non-acid solvent which is miscible with water in all proportions, and is substantially non-miscible with the hydrocarbon type liquid.

3. The process of claim 1, in which the sulfonium base is dissolved in water.

4. The process of claim 1, in which the sulfonium base is dissolved in a non-acid solvent which is miscible with water in all proportions and is substantially non-miscible with the hydrocarbon type liquid, said solvent containing a strong inorganic base.

5. The process of claim 1 in which the acid-reacting substances are mercaptans.

6. In the process of separating acid-reacting substances contained in an organic hydrocarbon type liquid by treating with an alkaline-reacting substance, the improvement comprising subjecting said liquid to a treatment with a solution of a tri-alkyl sulfonium hydroxide and alkali hydroxide, in which solution the concentration of the sulfonium hydroxide does not exceed about 50% by weight and the concentration of the combined hydroxides is less than 60% by weight, under conditions to absorb at least a portion of said acid-reacting substances in said solution and to form two layers, one comprising said solution of sulfonium base containing acid-reacting substances and the other consisting of the treated organic liquid, and separating said layers.

7. In the process of separating mercaptans from a hydrocarbon type liquid containing mercaptans and other acid-reacting substances, the improvement comprising pretreating said liquid with an aqueous alkaline-reacting substance capable of absorbing said acid substances, whereby the latter are substantially removed from said liquid, treating the resulting pretreated liquid containing mercaptans with a solution of a ternary sulfonium base under conditions to absorb mercaptans in said solution and to form two layers, one comprising the solution of sulfonium base containing at least a portion of said mercaptans and the other consisting of the treated liquid, and separating said layers.

8. In the process of separating acid-reacting substances contained in a hydrocarbon type liquid by treating with an alkaline-reacting substance, the improvement comprising subjecting said liquid to a treatment with a solution of a ternary sulfonium base having two alkyl and one aromatic radicals, under conditions to absorb at least a portion of said acid-reacting substances in said solution and to form two layers, one comprising said solution of sulfonium base containing acid-reacting substances and the other consisting of the treated organic liquid, and separating the layers.

9. In the process of separating acid-reacting substances contained in a hydrocarbon type liquid by treating with an alkaline-reacting substance, the improvement comprising subjecting said liquid to a treatment with a solution of benzyl diethyl sulfonium hydroxide under conditions to absorb at least a portion of said acid-reacting substances in said solution and to form two layers, one comprising said solution of sulfonium hydroxide containing acid-reacting substances and the other consisting of the treated organic liquid, and separating the layers.

DAVID LOUIS YABROFF.
JOHN WILKINSON GIVENS.